United States Patent
Zimmer

(10) Patent No.: US 9,770,792 B2
(45) Date of Patent: Sep. 26, 2017

(54) HEAT EXCHANGER HAVING AN INTERFERENCE RIB

(75) Inventor: Donald N. Zimmer, Marshalltown, IA (US)

(73) Assignee: Lennox Industries Inc., Richardson, TX (US)

( * ) Notice: Subject to any disclaimer, the term of this patent is extended or adjusted under 35 U.S.C. 154(b) by 991 days.

(21) Appl. No.: 12/834,145

(22) Filed: Jul. 12, 2010

(65) Prior Publication Data

US 2011/0174299 A1 Jul. 21, 2011

Related U.S. Application Data

(60) Provisional application No. 61/295,501, filed on Jan. 15, 210.

(51) Int. Cl.

| | | |
|---|---|---|
| *F24C 3/04* | (2006.01) | |
| *B23P 15/00* | (2006.01) | |
| *F23D 14/58* | (2006.01) | |
| *F23D 14/34* | (2006.01) | |
| *F24H 3/08* | (2006.01) | |
| *F24H 8/00* | (2006.01) | |
| *B29C 45/18* | (2006.01) | |
| *F25D 21/14* | (2006.01) | |
| *F24H 9/20* | (2006.01) | |
| *B29L 31/18* | (2006.01) | |

(52) U.S. Cl.
CPC .............. *B23P 15/00* (2013.01); *B29C 45/18* (2013.01); *F23D 14/34* (2013.01); *F23D 14/58* (2013.01); *F24H 3/087* (2013.01); *F24H 8/006* (2013.01); *F24H 9/2035* (2013.01); *F25D 21/14* (2013.01); *B29L 2031/18* (2013.01); *F23D 2900/14481* (2013.01); *Y02B 30/106* (2013.01); *Y10T 29/49* (2015.01); *Y10T 29/4935* (2015.01); *Y10T 29/49348* (2015.01); *Y10T 29/49389* (2015.01); *Y10T 29/49826* (2015.01); *Y10T 137/4463* (2015.04)

(58) Field of Classification Search
CPC .... F28D 1/0477; F28D 9/0031; F24H 3/0464; F24H 3/06; F24H 3/105; F24H 9/0068; F24H 9/0063
USPC .......... 126/85 R, 99 R, 110 R; 165/109.1, 83
See application file for complete search history.

(56) References Cited

U.S. PATENT DOCUMENTS

| | | | | | |
|---|---|---|---|---|---|
| 2,303,157 | A | * | 11/1942 | Bush | 165/74 |
| 3,940,837 | A | * | 3/1976 | Wiese | 29/890.044 |
| 4,131,159 | A | * | 12/1978 | Long | 165/166 |
| 4,467,780 | A | * | 8/1984 | Ripka | 126/110 R |
| 4,649,894 | A | * | 3/1987 | Hoeffken | 126/119 |
| 4,738,307 | A | * | 4/1988 | Bentley | 165/133 |
| 4,738,308 | A | * | 4/1988 | Moranne | 165/149 |
| 5,295,473 | A | * | 3/1994 | Neufeldt | 126/103 |
| 5,359,989 | A | * | 11/1994 | Chase et al. | 126/110 R |
| 5,361,751 | A | * | 11/1994 | Biggs | 126/101 |
| 5,690,470 | A | * | 11/1997 | Zimmer | 415/214.1 |

(Continued)

*Primary Examiner* — Jason Lau
(74) *Attorney, Agent, or Firm* — Frost Brown Todd LLC

(57) ABSTRACT

One aspect of this disclosure provides a heat exchanger that comprises a first panel half coupled to a corresponding second panel half that form a passageway having at least a first chamber adjacent an inlet end of the passageway and a second chamber and overlapping interference patterns formed in each of the first and second panel halves that extend along at least a portion of the length of the passageway and located between at least the first and second chambers.

19 Claims, 7 Drawing Sheets

(56) References Cited

U.S. PATENT DOCUMENTS

| | | | |
|---|---|---|---|
| 5,997,285 A * | 12/1999 | Carbone et al. | 431/354 |
| 6,109,254 A * | 8/2000 | Reinke et al. | 126/110 R |
| 6,224,288 B1 * | 5/2001 | Postma et al. | 403/30 |
| 6,516,871 B1 * | 2/2003 | Brown et al. | 165/8 |
| 6,564,795 B1 * | 5/2003 | Sears et al. | 126/110 R |
| 7,096,933 B1 * | 8/2006 | Zia et al. | 165/170 |
| D536,774 S * | 2/2007 | Kuo et al. | D23/330 |
| 2002/0040777 A1 * | 4/2002 | Tomlinson et al. | 165/163 |
| 2003/0102115 A1 * | 6/2003 | Lengauer et al. | 165/170 |
| 2003/0127087 A1 * | 7/2003 | Hill et al. | 126/99 R |
| 2003/0127218 A1 * | 7/2003 | Sears et al. | 165/170 |
| 2006/0157232 A1 * | 7/2006 | Specht | 165/134.1 |
| 2008/0078538 A1 * | 4/2008 | Jalilevand et al. | 165/170 |

* cited by examiner

HEAT EXCHANGER HAVING AN INTERFERENCE RIB

CROSS-REFERENCE TO RELATED APPLICATION

This application claims the benefit of U.S. Provisional Application Ser. No. 61/295,501, filed by Shailesh S. Manohar, et al., on Jan. 15, 2010, entitled "An Improved Heating Furnace for a HVAC System", and incorporated herein by reference in its entirety.

TECHNICAL FIELD

This application is directed, in general, to air heating furnace that can be used in a heating, ventilation air condition (HVAC) system and, more specifically, to a heat exchanger having an interference pattern located between at least first and second passageways of the heat exchanger.

BACKGROUND

A high-efficiency furnace typically employs several heat exchangers to warm an air stream passing through the furnace. The heat exchanger may include "clamshell" or individual panel halves formed by stamping mirror images of the combustion and exhaust chambers into corresponding metal sheets. The halves are then typically fastened together with what the industry calls "button mushrooms," which are often located on an outer perimeter of the metal sheets of the clamshell heat exchanger or similar fastening configurations.

SUMMARY

One aspect provides a HVAC heat exchanger that comprises a first panel half coupled to a corresponding second panel half that form a passageway having at least a first chamber adjacent an inlet end of the passageway and a second chamber and an overlapping interference pattern formed in each of the first and second panel halves that extend along at least a portion of the length of the passageway and located between at least the first and second chambers.

Another embodiment provides a method of fabricating a heat exchanger for a furnace unit. This embodiment comprises forming a first panel half having a first half of a passageway formed therein, forming a second panel half having a corresponding second half of the passageway formed therein, coupling the first and second panels together to form the passageway having at least a first chamber adjacent an inlet end of the passageway and a second chamber, and forming an overlapping interference pattern in each of the first and second panel halves that extend along at least a portion of the length of the passageway and located between at least the first and second chambers.

In another embodiment, a furnace is provided. In one embodiment, the HVAC furnace comprises a cabinet, a blower located within the cabinet and positioned to force air through the cabinet, a gas control valve located within the cabinet, burners located within the cabinet and coupled to the gas control valve, a controller located within the cabinet and electrically coupled to the blower and the gas control valve, and a heat exchanger positioned within the cabinet to receive a flame from the burners. In one embodiment, the heat exchanger comprises a first panel half coupled to a corresponding second panel half that form a passageway having at least a first chamber adjacent an inlet end of the passageway and a second chamber, and an overlapping interference pattern formed in each of the first and second panel halves that extend along at least a portion of the length of the passageway and located between at least the first and second chambers.

BRIEF DESCRIPTION

Reference is now made to the following descriptions taken in conjunction with the accompanying drawings, in which.

DETAILED DESCRIPTION

Figure 1:
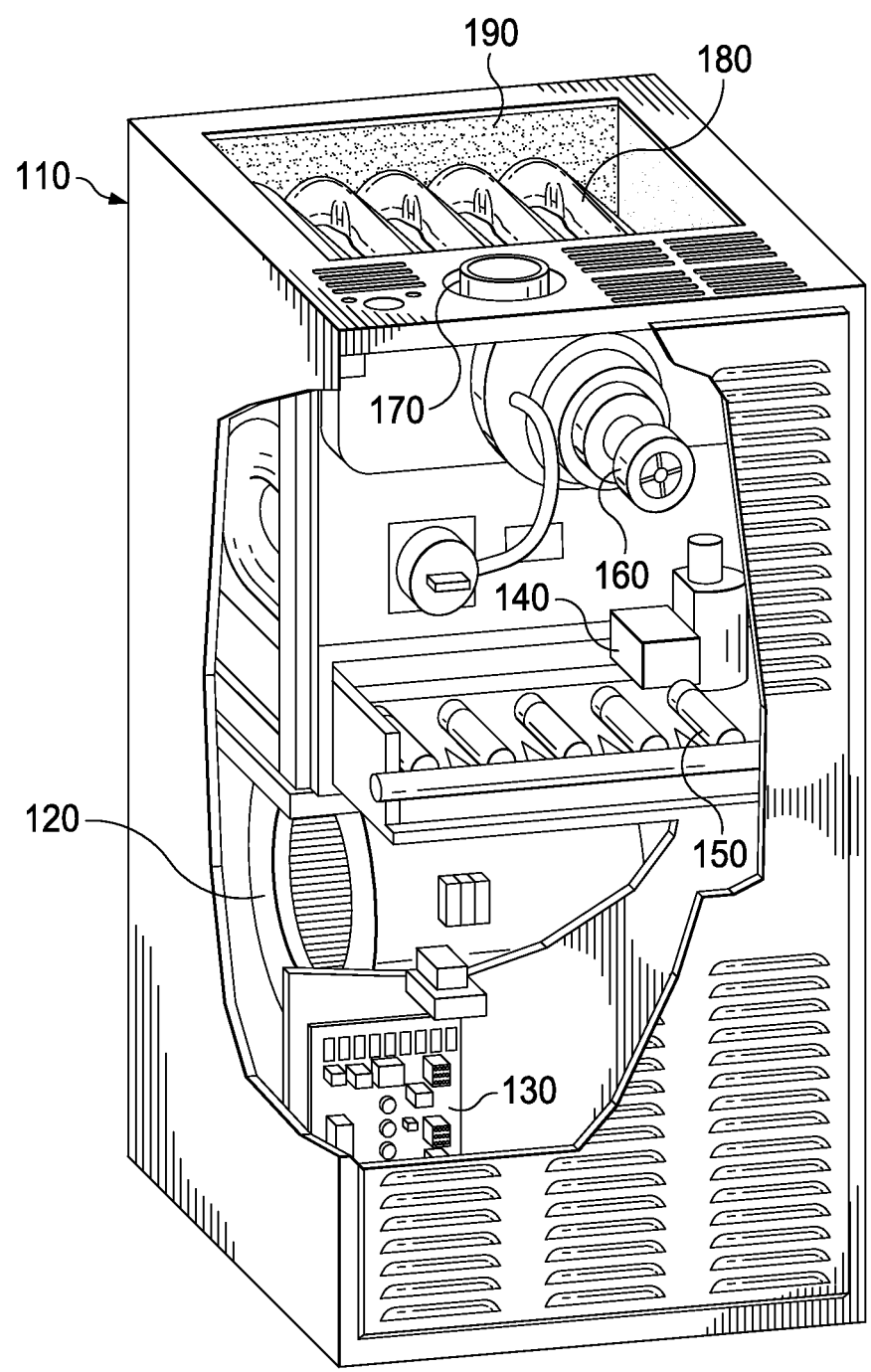
FIG. 1 illustrates a furnace of the disclosure.

Referring initially to FIG. 1, illustrated is an embodiment of a furnace 100 provided by this disclosure. The furnace 100 is described without limitation in terms of a gas-fired system. Those skilled in the pertinent art will appreciate that the principles disclosed herein may be extended to furnace systems using other fuel types. The furnace 100 includes various subsystems that may be conventional. A cabinet 110 encloses a blower 120, a controller 130, a gas control valve 140, burners 150, an exhaust blower 160, and an exhaust outlet 170. A heat exchanger assembly 180 is located within a plenum 190. The controller 130 controls the burners 150 and the exhaust blower 160 to burn a heating fuel, e.g. natural gas, and move exhaust gases through the heat exchanger assembly 180 to the exhaust outlet 170. The controller 130 may further control the blower 120 to move air over the heat exchanger assembly 180, thereby transferring heat from the exhaust gases to the air stream.

Figure 2:
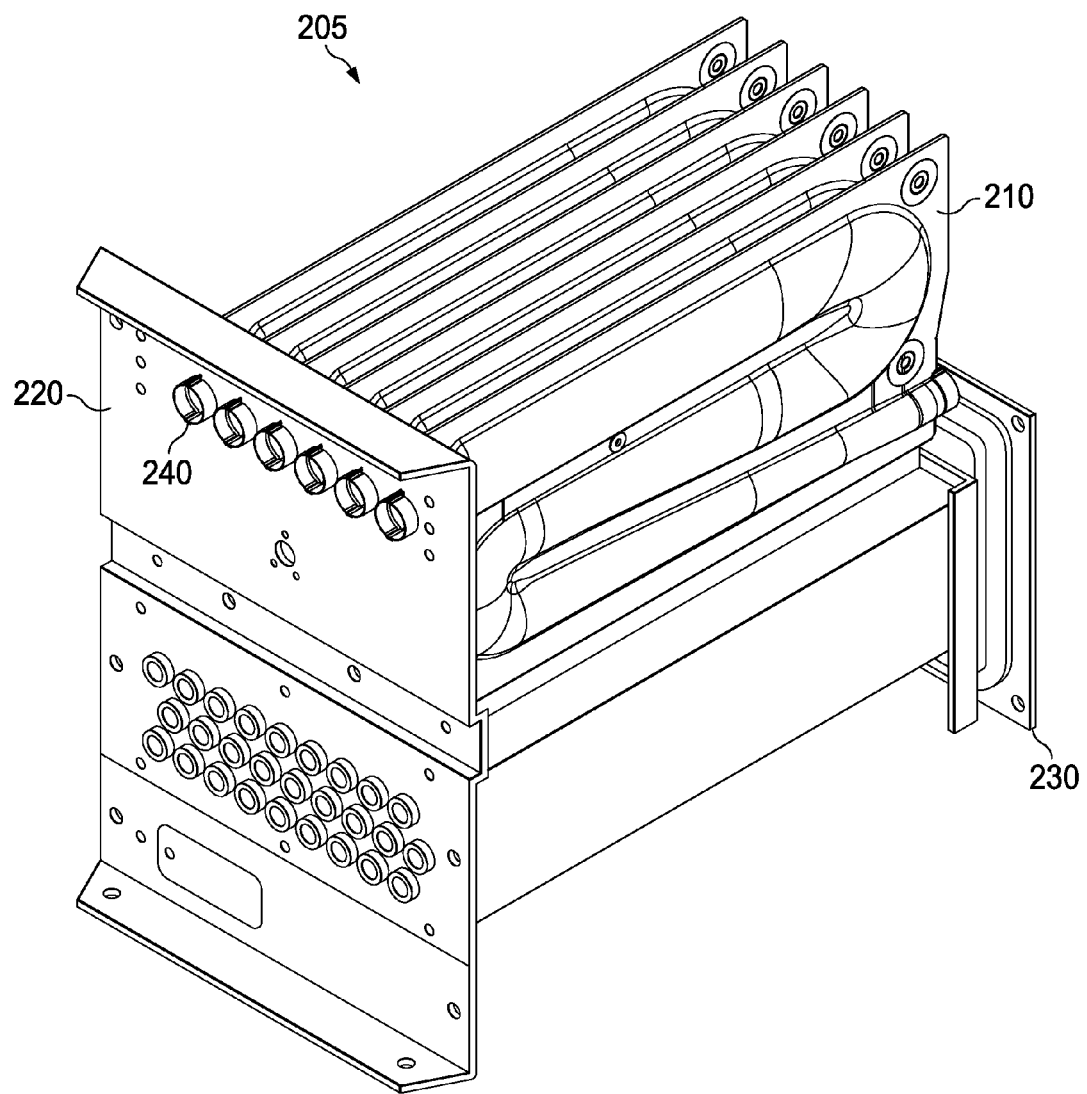
FIG. 2 illustrates a heat exchanger assembly that includes an embodiment of the heat exchanger as set forth therein.

FIG. 2 illustrates a heat exchanger assembly 205 that includes at least one embodiment of a heat exchanger panel 210 as provided herein and that may be implemented in the furnace illustrated in FIG. 1. A plurality of heat exchangers 210, are joined to a vest panel 220 and a collector box 230 by conventional flare-crimp joints 240. When incorporated into a furnace as shown in FIG. 1, a gas/fuel manifold and burner assembly (not shown) would be located adjacent the vest panel 220 to provide a flame to each of the heat exchanger panels 210. The illustrated heat exchanger assembly 205 is provided by way of example without limitation to a particular configuration of heat exchangers and components to which the heat exchangers are joined.

Figure 3A:
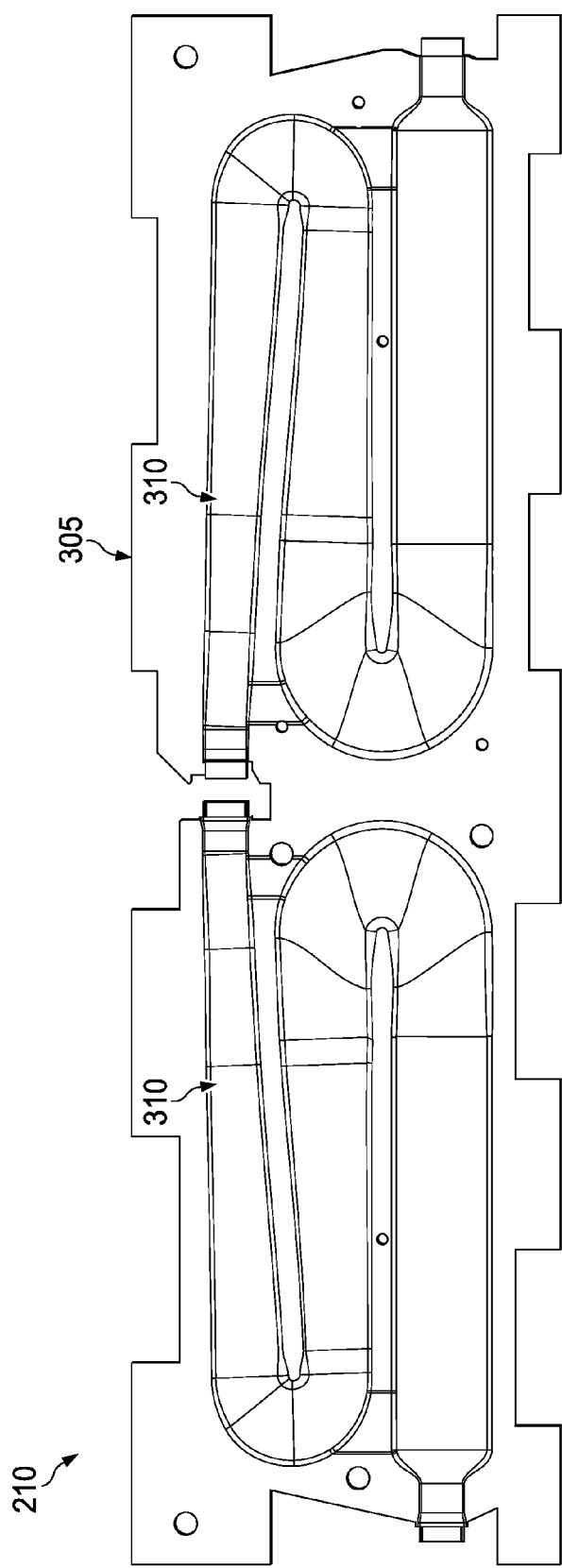
FIGS. 3A-3D illustrate various stages of manufacture of an embodiment of one of the heat exchangers shown in FIG. 2.
Figure 3B:
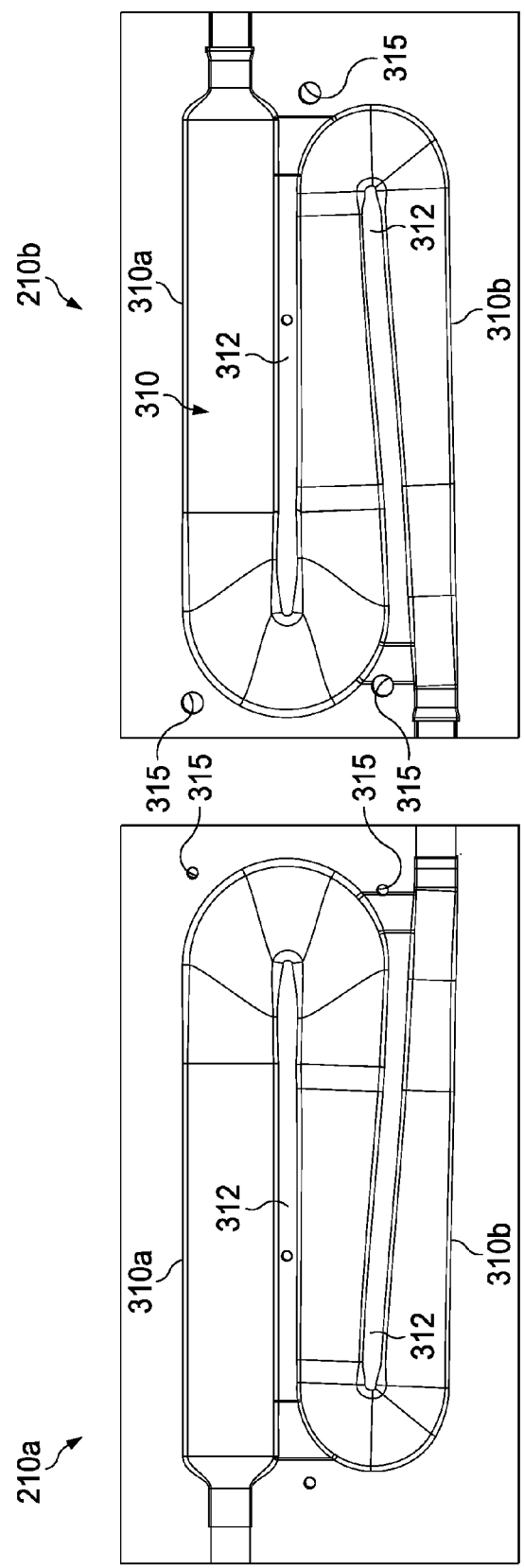
Figure 3C:
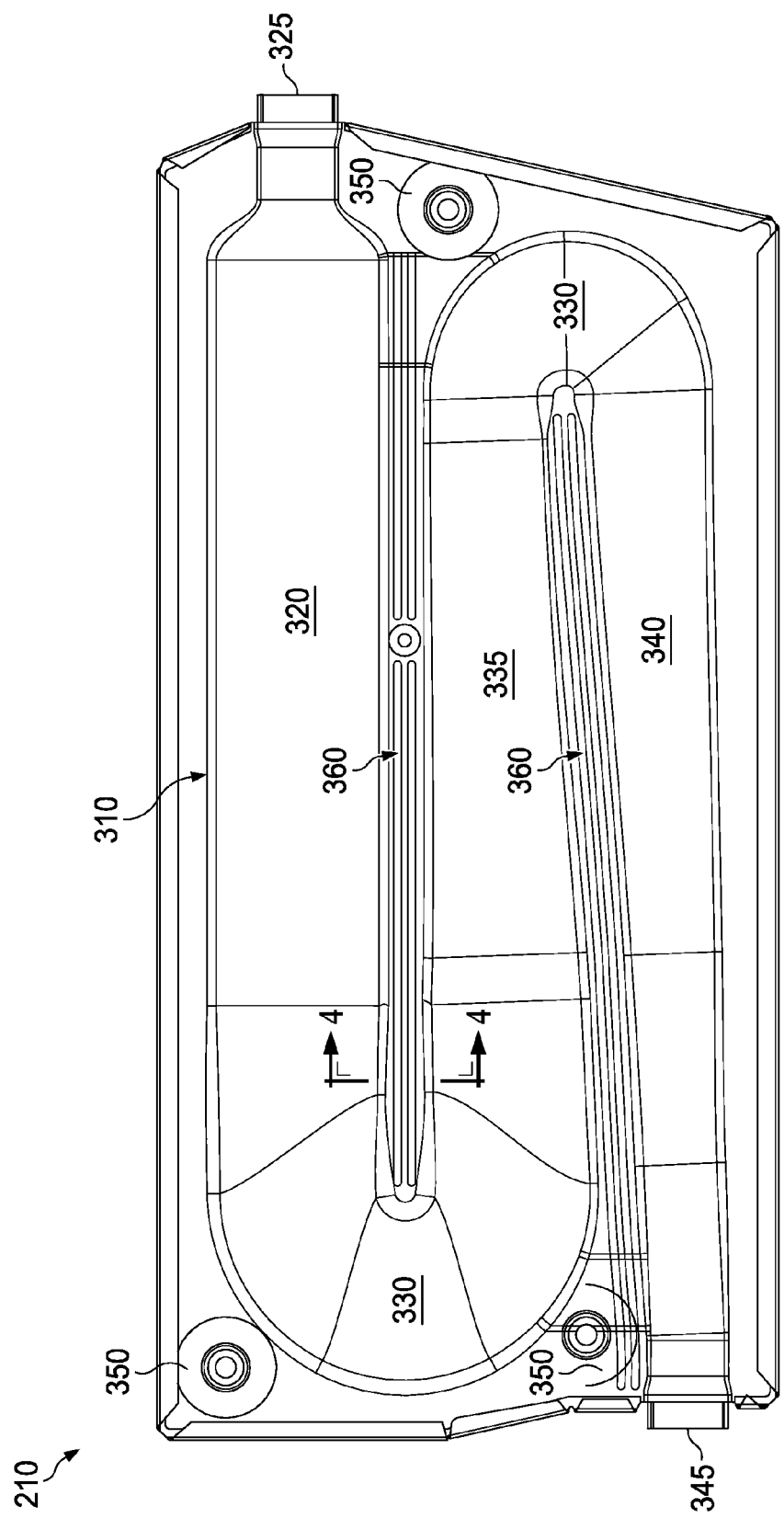

In one embodiment, partial steps of a method of forming the heat exchanger panel 210 of FIG. 2 are shown in FIGS. 3A, 3B, and 3C. In one step, a conventional process may be used to draw a sheet metal panel 305 through a mold to form mirror images of a passageway 310 in each side of the panel 305, after which, it may proceed through one or more conventional trimming stations, resulting in the sheet metal panel 305, as shown in FIG. 3A. The sheet metal panel 305 may then proceed to additional conventional trimming stations where it is further trimmed and ultimately separated into two separate panels 210a, 210b as shown in FIG. 3B. Each panel 210a, 210b includes one-half of passageway 310, with each half of the passageway 310 having an inlet 310a and an outlet 310b. A surface region 312 is present between chambers or segments of the passageway 310. In certain embodiments, this surface region 312 is substantially planar or flat. However, in other embodiments, an irregular or non-planar surface may be present between the chamber or segments of the passageway 310, in that minor ridges or indentations may be present in surface region 312. Corresponding fastener points 315 are also formed in each half panel 210a and 210b. These may be of conventional design, for example, the fasteners 315 may be "button mushrooms," that are often used to hold similar panels together, or they may be sheet metal screws, bolts, or fastening eyelets.

FIG. 3C illustrates the two panels 210a and 210b assembled together using conventional crimping processes to form the heat exchanger panel 210. The panel 210 may be formed from any type of sheet metal suitable for use in heat exchanger applications. Such materials include, without limitation, aluminized steel (TI-25, e.g.), drawing quality high temperature (DQHT) sheet, extra-deep drawing steel (EDDS), and stainless steel. When joined, the two panel halves 210a and 210b form the heat exchanger panel 210 that includes a first chamber 320 located adjacent an inlet end 325 and in which a substantial portion of the heat transfer from the heat exchanger panel 210 to the surrounding air takes place. The first chamber 320 is connected by one or more bends 330 to other portion or portions of the passageway 310. In the embodiment illustrated in FIG. 3C, the heat exchanger 210 includes two such bends that connect the first chamber 320 to an intermediate, second chamber 335, with the second bend 310 connecting the second chamber 335 to a third chamber 340 adjacent an outlet or exhaust end 345. The passageway 310 is illustrated without limitation as a serpentine passageway. However, in other embodiments, the passageway 310 may be a U-shaped passageway, such that the inlet 310a and the outlet 310b are located on a same side of the heat exchanger 210, as shown FIG. 3D, which has similarly designated features as FIG. 3C where applicable.

A number of fasteners points 350 hold the heat exchanger panels 210a and 210b together to form the heat exchanger 210. As mentioned above, the fasteners 350 may be of conventional design. However, these conventional fasteners have disadvantages associated with them, particularly in compact heat exchanger designs as illustrated herein. The heat exchanger 210 is configured to receive a fuel/air mixture at the inlet end 325. The fuel in the fuel/air mixture is substantially consumed in the combustion passageway 320. Hot exhaust, e.g. flue gas, flows through the passageway 310 and exits the heat exchanger 210 at the outlet end 345. Most, e.g., about 80% to about 90%, of the energy released by the burning fuel is transferred to the air flowing over the exterior surface of the heat exchanger 210.

The heat exchanger 210 has a non-zero thermal coefficient of expansion (TEC). As such, the thermal gradient can cause the individual panels 210a and 210b to expand. However, the fasteners 350 do not sufficiently hold the two halves together to prevent slight separation of the panels 210a and 210b. As a result, flue gases can pass between the panels in the surface regions 312 and into adjoining chambers 335 and 340 in the embodiment shown in FIG. 3C or chambers 310a and 310b in the embodiment shown in FIG. 3D. This is particularly the case when the surface regions 312 are substantially flat or planar. This, in turn, reduces the efficiency of the heat exchanger. Test results have shown that adding additional fasteners between the chambers does not satisfactorily reduce this efficiency loss.

Figure 3D:
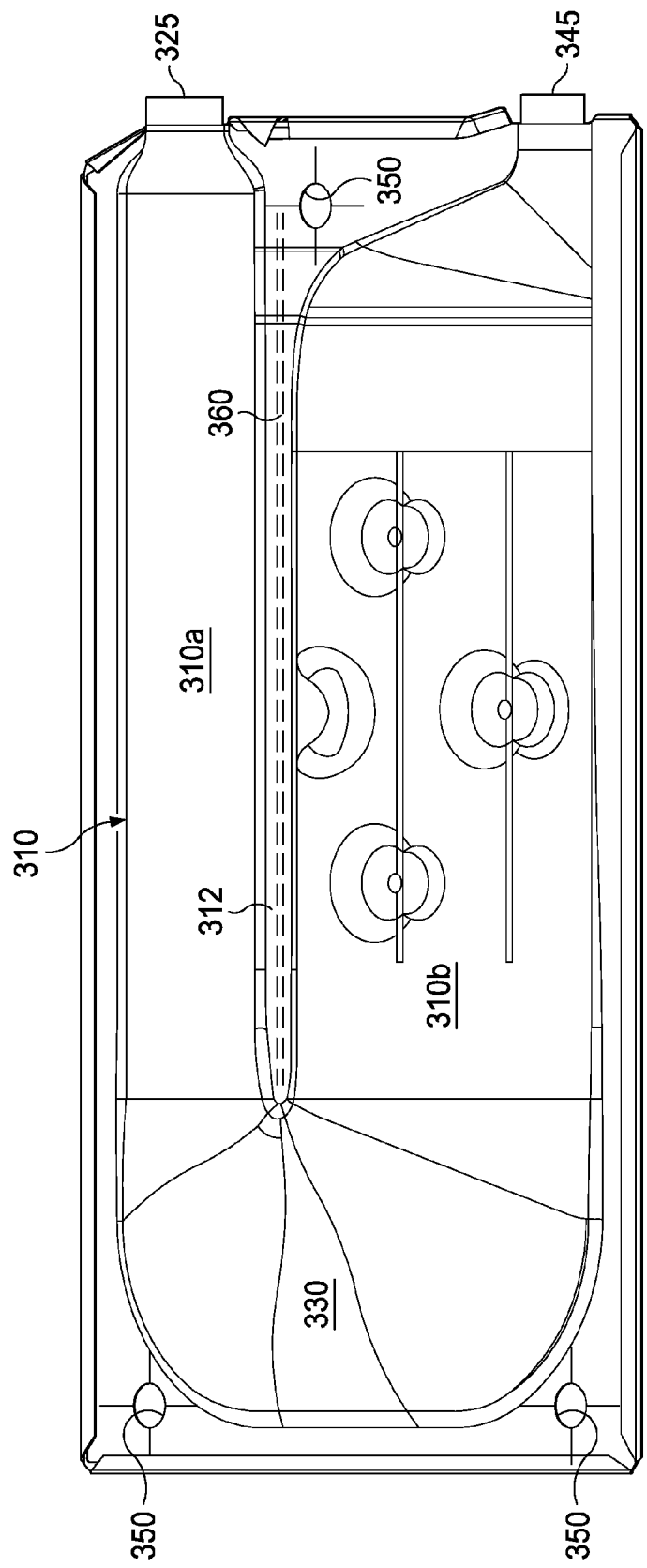

To address this problem, it has been presently recognized that forming an interference pattern 360 between the chambers 320, 335, and 340 of FIG. 3C, or chambers 310a and 310b of FIG. 3D, significantly improves the efficiency of the furnace by providing a resistive path for the flue gases, even during the expansion of the individual panels during the heating process. As used herein, an "interference pattern" is one where the surface region 312 between opposing individual panels 210a, 210b is shaped to form an irregular path between the space separating the panels 210a, 210b. In some embodiments, the interference pattern may take the form of a rib configuration, variations of which are discussed below. The interference pattern 360 extends along at least a portion of the length of the passageway and is located between at least the first and second chambers. It should be understood that other embodiments will provide the interference pattern to also be located on the outer perimeter of the passageway 310 or the heat exchanger 210. The interference pattern 360 creates an overlap between the individual panels 210a and 210b to prevent bypass of gas flue between chambers 320, 335, 340 (FIG. 3C) or 310a, 310b (FIG. 3D), given that the flue gasses should take the path of least resistance. Accordingly, the depth of the interference pattern can be designed to prevent a straight line passage between chambers 320, 335, 340 (FIG. 3C), or 310a or 310b (FIG. 3D) during the expansion process as the heat exchanger 210 reaches maximum temperatures. The interference pattern can be configured to create 1 to 3 points of overlap resisting straight line passage between chambers. Additionally, as the heat exchanger 210 cools, the interference pattern 360 can also act as a tapered locating device to seat the heat exchanger 210 back into its original position. In an advantageous embodiment, the interference pattern 360 is formed after the two halves 210a and 210b have been joined (i.e., after the perimeter crimp operation is completed) to insure good mating alignment. The interference pattern 360 may be made using an appropriate press die process or similar processes that would be readily apparent to those skilled in the art, given the disclosure herein.

Figure 4A:
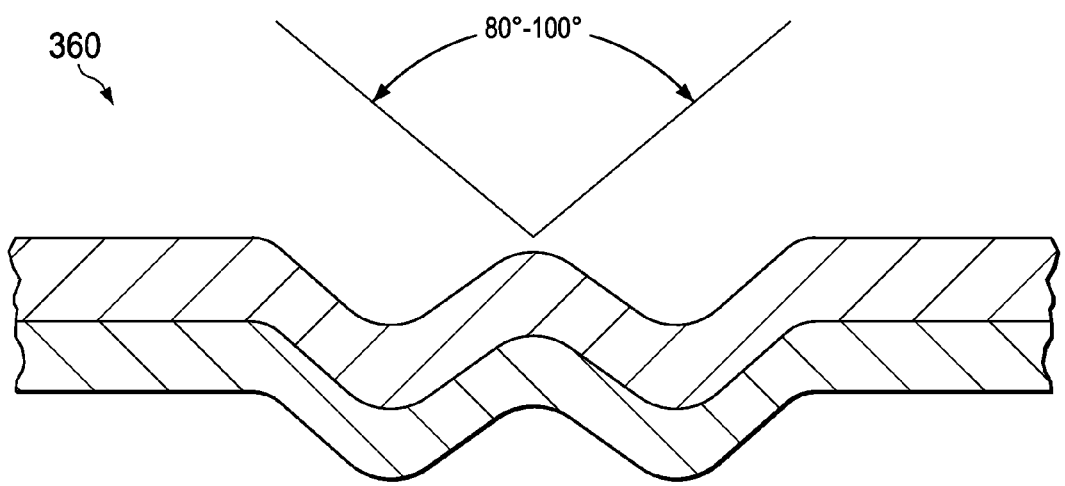
FIGS. 4A-4C illustrate examples of configurations of the interference pattern formed in the heat exchanger panel.
Figure 4B:
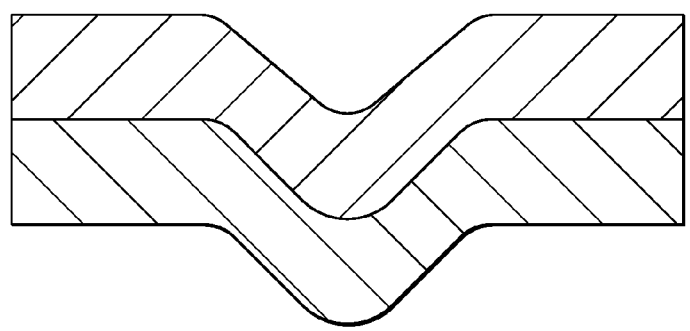
Figure 4C:
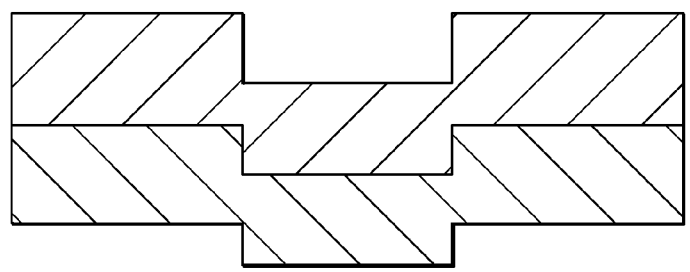

FIGS. 4A-4C illustrate different examples of the interference pattern 360 that can be used in the heat exchanger panel 210. As seen, various geometric patterns can be used. For example, the interference pattern 360 may have a "W" configuration as shown in FIG. 4A, which may also be a repeating zig-zag pattern of "Ws" (e.g. "WWWW"). Alternatively, it may have a "V" shaped configuration, as shown in FIG. 4B, or it may have a "U" shaped configuration as shown in FIG. 4C, or a hemi-spherical configuration, which is not shown. Other configurations are also within the scope of this disclosure and the foregoing configurations have been given only for purposes of illustrating non-limiting examples. The interference pattern 360 may also have different depths and overall dimensions as dictated by required design parameters. For example, the overall width of the interference pattern 360 may range from about 0.237 inches to about 0.333 inches. Also, with regard to those configurations that have opposing slopes, such as the one illustrated in FIG. 4A, an angle of separation of the intersection of the opposing slopes may range from about 80° to 100°.

From the foregoing, it is readily apparent that given the size constraints relative to the smaller sized heat exchangers 210, the interference pattern eliminates a straight line bypass between chambers during the heating and expansion process, forcing the flue gases to better maintain a path within the passageway. It also creates two rigid parallel mating surfaces that have a funneling effect to properly seat the panels 210a and 210b back into their original position during the cool down process.

Those skilled in the art to which this application relates will appreciate that other and further additions, deletions, substitutions and modifications may be made to the described embodiments.

What is claimed is:

1. A furnace heat exchanger, comprising:
a first panel half defined by a first outer perimeter;
a corresponding second panel half defined by a second outer perimeter, said first and second panel halves being joined together at least at said first and second outer perimeters to form a heat exchanger panel having a passageway having at least a first chamber adjacent an inlet end of said passageway and a second chamber; and
overlapping interference patterns formed in a surface region of each of said first and second panel halves such that said interference patterns of said first and second panel halves contact each other and are shaped to form an irregular path between a space separating said first and second panel halves, said interference patterns extending along at least a portion of a length of said passageway and being located between at least said first and second chambers such that said interference patterns resist the passage of flue gasses therethrough when heating of the heat exchanger panel causes a slight separation between said first panel half and said second panel half, wherein the overlapping interference patterns have been formed after the first and second panel halves have been joined together, and wherein one end of an overlapping interference pattern is proximate a bend in the irregular path and the other end is proximate a coupled perimeter of the first and second panel halves.

2. The furnace heat exchanger recited in claim 1, wherein said second chamber is an intermediate chamber and said passageway includes a third chamber adjacent an exhaust end of said passageway, wherein said second chamber is located between said first and third chambers.

3. The furnace heat exchanger recited in claim 2, wherein said overlapping interference patterns are located between said first and second chambers and between said second and third chambers in flat surfaces located therebetween.

4. The furnace heat exchanger recited in claim 1, wherein said overlapping interference patterns are opposing crimp patterns formed in said first and second panel halves.

5. The furnace heat exchanger recited in claim 4, wherein said crimp has a "W" configuration.

6. The furnace heat exchanger recited in claim 5, wherein said "W" configuration has opposing slopes, wherein angle of an intersection of said opposing slopes ranges from about 80 degrees to about 100 degrees, and a width of said overlapping interference patterns ranges from about 0.237 inches to about 0.333 inches.

7. A method of fabricating a heat exchanger, comprising:
forming a first panel half defined by a first outer perimeter and having a first half of a passageway formed therein;
forming a second panel half defined by a second outer perimeter and having a corresponding second half of said passageway formed therein;
coupling said first and second panels together at least at said first and second outer perimeters to form a heat exchanger panel having said passageway having at least a first chamber adjacent an inlet end of said passageway and a second chamber; and
forming overlapping interference patterns in a surface region of each of said first and second panel halves after coupling said first and second panels, such that said surface regions of said first and second panel halves contact each other and are shaped to form an irregular path between a space separating said first and second panel halves, said interference patterns extending along at least a portion of a length of said passageway and being located between at least said first and second chambers such that said interference patterns resist the passage of flue gasses therethrough when heating of the heat exchanger panel causes a slight separation between said first panel half and said second panel half, and wherein one end of an overlapping interference pattern is proximate a bend in the irregular path and the other end is proximate the coupled first and second outer perimeters.

8. The method recited in claim 7, wherein said first and second panel halves have a flat surface located between said first and second chambers and wherein said forming overlapping interference patterns includes forming said interference patterns in a portion of said flat surface of each of said first and second panel halves.

9. The method recited in claim 7, wherein said second chamber is an intermediate chamber and wherein coupling said first and second panel halves together to form said passageway includes forming a third chamber adjacent an exhaust end of said passageway, wherein said second chamber is located between said first and third chambers.

10. The method recited in claim 9, wherein forming said overlapping interference patterns includes forming said overlapping interference patterns in a flat surface of each of said first and second panels and between said first and second chambers and between said second and third chambers.

11. The method recited in claim 7, wherein forming said overlapping interference patterns includes forming a crimp in said first and second panel halves.

12. The method recited in claim 11, wherein forming said crimp includes forming a "W" configuration.

13. The method recited in claim 12, wherein forming said "W" configuration includes forming opposing slopes, wherein an angle of an intersection of said opposing slopes ranges from about 80 degrees to about 100 degrees, and a width of said overlapping interference patterns ranges from about 0.237 inches to about 0.333 inches.

14. A furnace, comprising:
a cabinet;
a blower located within said cabinet and positioned to force air through said cabinet;
a gas control valve located within said cabinet;
burners located within said cabinet and coupled to said gas control valve;
a controller located within said cabinet and electrically coupled to said blower and said gas control valve; and
a heat exchanger positioned within said cabinet to receive a gas flame from said burners and, comprising:
a first panel half defined by a first outer perimeter and coupled at least to a corresponding second outer perimeter of a second panel half to form said heat exchanger having a passageway having at least a first chamber adjacent an inlet end of said passageway and a second chamber; and
overlapping interference patterns formed in a surface region of each of said first and second panel halves, such that said surface regions of said first and second panel halves contact each other and are shaped to form an irregular path between a space separating said first and second panel halves, said interference patterns extending along at least a portion of a length of said passageway and being located between at least said first and second chambers such that said interference patterns resist the passage of flue gasses therethrough when heating of the heat exchanger panel causes a slight separation between said first panel half and said second panel half, wherein the overlapping interference patterns have been formed after the first and second panel halves have been joined together, and wherein one end of an overlapping interference pattern is proximate a bend in the irregular path and the other end is proximate a coupled perimeter of the first and second panel halves.

15. The furnace recited in claim 14, wherein said first and second panel halves having a flat surface located between said first and second chambers and wherein said overlapping interference patterns are formed in a portion of said flat surface.

16. The furnace recited in claim 14, wherein said second chamber is an intermediate chamber and said passageway includes a third chamber adjacent an exhaust end of said passageway, wherein said second chamber is located between said first and third chambers.

17. The furnace recited in claim 16, wherein said overlapping interference patterns are located between said first and second chambers and between said second and third chambers in flat surfaces located therebetween.

18. The furnace recited in claim 14, wherein said overlapping interference patterns is a crimp formed in said first and second panel halves.

19. The furnace recited in claim 15, wherein said overlapping interference patterns have a "W" configuration, wherein an angle of an intersection of opposing slopes of said "W" configuration ranges from about 80 degrees to about 100 degrees, and a width of said overlapping interference patterns ranges from about 0.237 inches to about 0.333 inches.

* * * * *